(12) United States Patent
Hardisty et al.

(10) Patent No.: US 8,068,505 B2
(45) Date of Patent: Nov. 29, 2011

(54) COMMUNICATIONS NETWORK BRIDGE AND A COMMUNICATIONS SYSTEM COMPRISING SUCH A BRIDGE

(75) Inventors: Timothy Hardisty, Salisbury (GB); Anthony James Marks, Andover (GB); Christopher Michael Nott, Camberly (GB)

(73) Assignee: Trilogy Communications Holdings Ltd., Andover, Hampshire (GB)

( * ) Notice: Subject to any disclaimer, the term of this patent is extended or adjusted under 35 U.S.C. 154(b) by 204 days.

(21) Appl. No.: 12/498,076

(22) Filed: Jul. 6, 2009

(65) Prior Publication Data
US 2010/0027553 A1    Feb. 4, 2010

(30) Foreign Application Priority Data
Aug. 1, 2008    (GB) .................................. 0814050.1

(51) Int. Cl.
*H04L 12/28* (2006.01)
(52) U.S. Cl. ........................................ 370/401; 370/404
(58) Field of Classification Search .................. None
See application file for complete search history.

(56) References Cited

U.S. PATENT DOCUMENTS

| | | | |
|---|---|---|---|
| 2005/0213517 A1* | 9/2005 | Rodman et al. | 370/260 |
| 2006/0092945 A1 | 5/2006 | Hallmark et al. | |
| 2006/0236093 A1 | 10/2006 | Brok et al. | |
| 2007/0274327 A1* | 11/2007 | Kaarela et al. | 370/401 |
| 2008/0112392 A1* | 5/2008 | Mansfield | 370/352 |
| 2008/0151907 A1* | 6/2008 | Ge et al. | 370/395.53 |
| 2008/0192769 A1* | 8/2008 | Tischer et al. | 370/466 |
| 2008/0247541 A1* | 10/2008 | Cholas et al. | 380/200 |
| 2009/0300147 A1* | 12/2009 | Beers et al. | 709/220 |

* cited by examiner

*Primary Examiner* — Phirin Sam
(74) *Attorney, Agent, or Firm* — Young Basile (57) ABSTRACT

A bridge for linking a first communications network to a second communications network is taught. The bridge comprises a first bridge module linked to the first communications network and a second bridge module linked to the second communications network. The first bridge module is linked to the second bridge module by only an analog audio link and a General Purpose Input Output call negotiation signalling link such that generic digital data cannot effectively pass between the first communications network and the second communications network through the bridge elements. There is also provided a network terminal for connection to a network connected to the bridge and communications system comprising the bridge and first communications network.

13 Claims, 11 Drawing Sheets

| State | Description | Caller bridge vpanel ||||||||  Responder bridge vpanel ||||||||
|---|---|---|---|---|---|---|---|---|---|---|---|---|---|---|---|---|---|
| | | GPI |||| GPO |||| GPI |||| GPO ||||
| | | Req | Rej | Acc | PTT | Req | Rej | Acc | PTT | Req | Rej | Acc | PTT | Req | Rej | Acc | PTT |
| | Route not established | 0 | 0 | 0 | 0 | 0 | 0 | 0 | 0 | 0 | 0 | 0 | 0 | 0 | 0 | 0 | 0 |
| 1 | Caller request | 0 | 0 | 0 | 0 | 1 | 0 | 0 | 0 | 0 | 0 | 0 | 0 | 0 | 0 | 0 | 0 |
| 2 | Responder received request | 0 | 0 | 0 | 0 | 1 | 0 | 0 | 0 | 1 | 0 | 0 | 0 | 0 | 0 | 0 | 0 |
| 3 | Handshake completed | 1 | 0 | 0 | 0 | 1 | 0 | 0 | 0 | 1 | 0 | 0 | 0 | 1 | 0 | 0 | 0 |
| 4 | Responder reject | 1 | 0 | 0 | 0 | 1 | 0 | 0 | 0 | 1 | 0 | 0 | 0 | 0 | 1 | 0 | 0 |
| 5 | Caller received reject | 1 | 1 | 0 | 0 | 0 | 1 | 0 | 0 | 1 | 0 | 0 | 0 | 0 | 1 | 0 | 0 |
| 6 | Responder accepts | 1 | 0 | 1 | 0 | 1 | 0 | 0 | 0 | 1 | 0 | 0 | 0 | 1 | 0 | 1 | 0 |
| 7 | Route established | 1 | 0 | 1 | 0 | 1 | 0 | 0 | 0 | 1 | 0 | 0 | 0 | 1 | 0 | 1 | 0 |
| 8 | Caller received terminate | 1 | 0 | 0 | 0 | 0 | 0 | 0 | 0 | 1 | 0 | 0 | 0 | 1 | 0 | 1 | 0 |
| 9 | Responder request GPI inactive | 0 | 1 | 0 | 0 | 1 | 0 | 0 | 0 | 0 | 0 | 0 | 0 | 1 | 0 | 1 | 0 |
| 10 | Responder received terminate | 1 | 0 | 1 | 0 | 1 | 0 | 0 | 0 | 0 | 0 | 0 | 0 | 0 | 1 | 0 | 0 |
| 11 | Caller accept GPI inactive | 1 | 0 | 0 | 0 | 1 | 0 | 0 | 0 | 0 | 0 | 0 | 0 | 0 | 1 | 0 | 0 |
| 12 | Caller PTT | 1 | 0 | 1 | 1 | 1 | 0 | 0 | 1 | 1 | 0 | 0 | 0 | 1 | 0 | 1 | 0 |
| 13 | Responder PTT | 1 | 0 | 1 | 0 | 0 | 0 | 0 | 0 | 1 | 0 | 0 | 1 | 1 | 0 | 1 | 1 |
| 14 | Responder Reject GPI fails | 1 | 0 | 1 | 0 | 0 | 1 | 0 | 0 | 1 | 0 | 0 | 0 | 1 | 0 | 1 | 0 |
| 15 | Responder Request GPI fails | 1 | 0 | 1 | 0 | 1 | 0 | 0 | 0 | 1 | 0 | 0 | 0 | 1 | 0 | 1 | 0 |
| 16 | Caller Reject GPI fails | 1 | 0 | 1 | 0 | 1 | 0 | 0 | 0 | 1 | 0 | 0 | 0 | 0 | 1 | 0 | 0 |
| 17 | Caller Accept GPI fails | 1 | 0 | 0 | 0 | 1 | 0 | 0 | 0 | 0 | 0 | 0 | 0 | 1 | 0 | 1 | 0 |
| 18 | Route not established | 0 | 0 | 0 | 0 | 0 | 0 | 0 | 0 | 0 | 0 | 0 | 0 | 0 | 0 | 0 | 0 |

COMMUNICATIONS NETWORK BRIDGE AND A COMMUNICATIONS SYSTEM COMPRISING SUCH A BRIDGE

CROSS-REFERENCE TO RELATED APPLICATIONS

This application claims priority from UK patent application GB 0814050.1, filed Aug. 1, 2008.

FIELD OF THE INVENTION

This invention relates to a bridge between communications networks and to a communications system comprising such a bridge.

BACKGROUND OF THE INVENTION

Figure 1:
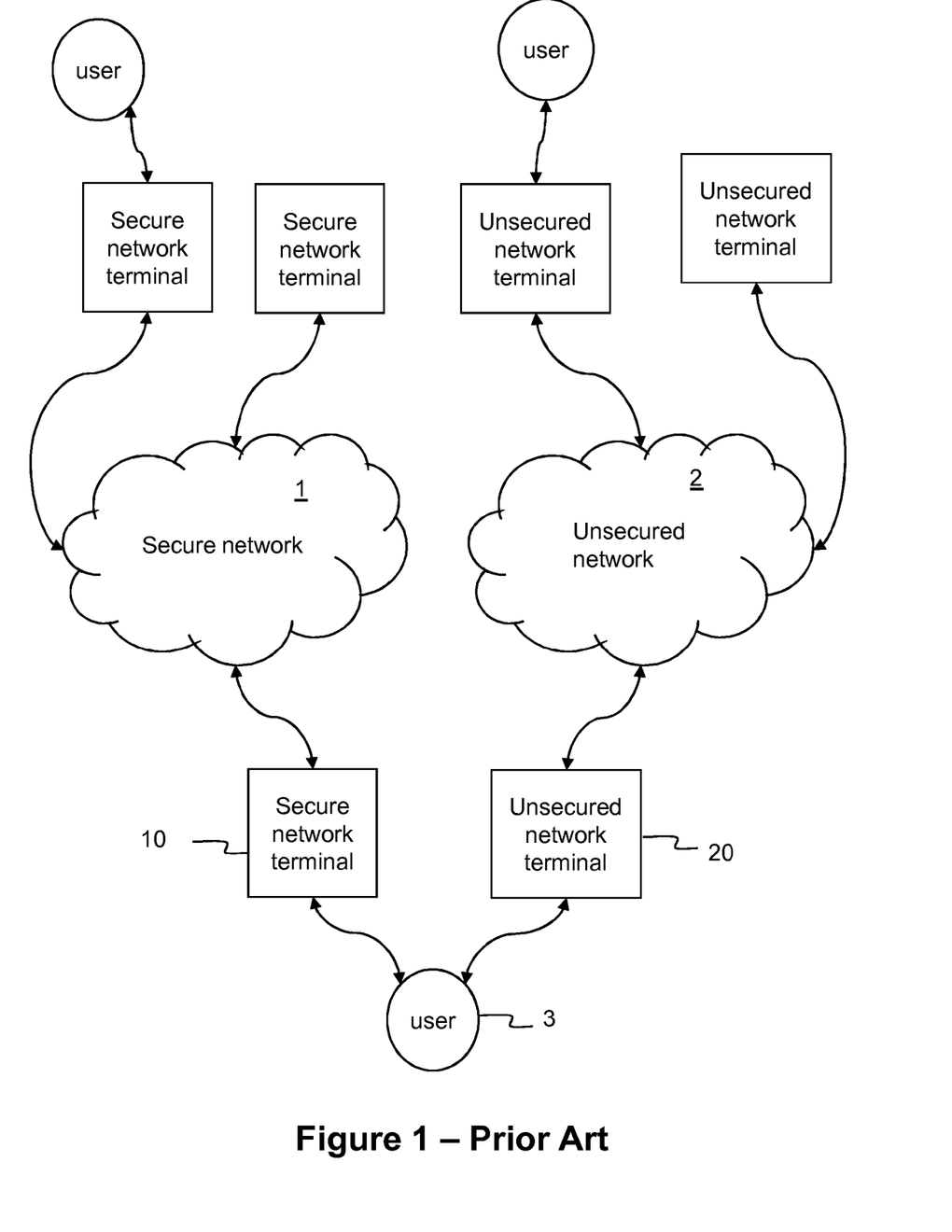
FIG. 1 is a schematic diagram of a user having access to two networks according to the prior art.

Secure communications networks, including audio communication facilities, which are available only to authorised users, are well known for use, for example, by defence services, by police or by financial or commercial enterprises. However it is a frequent requirement of a user of a terminal on such a secure network also to have access to open, unsecured networks or to networks with a lower level of security, or for users on such a lower security or unsecured network to have access to a user on a secure network. Referring to FIG. 1, to avoid any possibility of digital data passing from a first network 1 to a second, less secure, network 2, a known solution is to provide a user 3 of a secure network 1 with two terminals, a first terminal 10 connected to the secure network 1 and a second terminal 20 connected to the less secure or unsecured network 2. The two terminals may be housed in a same cabinet or housing, possibly with a shared microphone for use on both networks, but effectively two separate and mutually isolated terminals need to be provided to the user. This doubling of equipment is clearly an expensive solution to the problem of preventing digital data passing between the networks both in terms of the initial provision of terminals and in their maintenance.

There is another known variant of this solution that involves a "mediator", as follows. When a first operator needs to talk with a second operator at another site, the first operator approaches a first mediator at the first operator's site to inform the first mediator that information is required from the other site, with which the first operator does not have security clearance to communicate.

The first mediator contacts a second mediator at the other site and the second mediator communicates with an analyst at the other site and information from the analyst is relayed via the mediators back to the first operator. However, often multiple mediators are involved to allow requests to work up through security levels, which is clearly inefficient and subject to error.

SUMMARY

According to a first aspect of the invention, there is provided bridge means for linking a first communications network to a second communications network arranged to prevent digital data readily passing between the first communications network and the second communications network through the bridge means, the bridge means comprising a first bridge module linked to the first communications network and a second bridge module linked to the second communications network, wherein the first bridge module is linked to the second bridge module by only an analog audio link and a General Purpose Input Output call negotiation signalling link, which do not support digital data transmission.

Conveniently, the bridge means is arranged such that latency in the General Purpose Input Output call negotiation signalling link results in a signalling data rate between the first bridge module and the second bridge module too slow for effective digital data transmission between the first communications network and the second communications network through the bridge means.

Advantageously, the signalling link is controlled by a state machine with limited predetermined available states arranged so that the bridge means cannot be used for generic digital data transfer.

Advantageously, the bridge means are arranged to link a first communications network to a second communications network wherein the first communications network has a higher security classification than the second communications network.

Conveniently, at least one of the first and second communications networks is an Internet Protocol network supporting at least one of Voice over Internet Protocol and Radio over Internet Protocol.

According to a second aspect of the invention there is provided network terminal means arranged to communicate with a first communications network linked to a second communication network by bridge means as claimed in any of the preceding claims, wherein the network terminal comprises: interface means connectable via router means to the first communications network; audio input/output means for communication with the interface means and user interface means connectable to the first communications network for call management of the network terminal means.

Conveniently, the network terminal means further comprises push-to-talk means.

Conveniently, the network terminal means comprises radio transmitter/receiver means connectable to interface means and arranged to communicate wirelessly with mobile radio means.

Advantageously, the user interface means comprises browser means comprising browser call management means for call negotiation.

Advantageously, the browser call management means comprises call rejection means.

According to a third aspect of the invention, there is provided a communications system comprising bridge means as described above linking a first communications network and a second communications network.

Conveniently, the communications system comprises configuration control for controlling between which users on the first and second networks communications are authorised.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the accompanying drawings, in which.

DETAILED DESCRIPTION OF PREFERRED EMBODIMENTS

Throughout the description, identical reference numerals are used to identify like parts.

Figure 2:
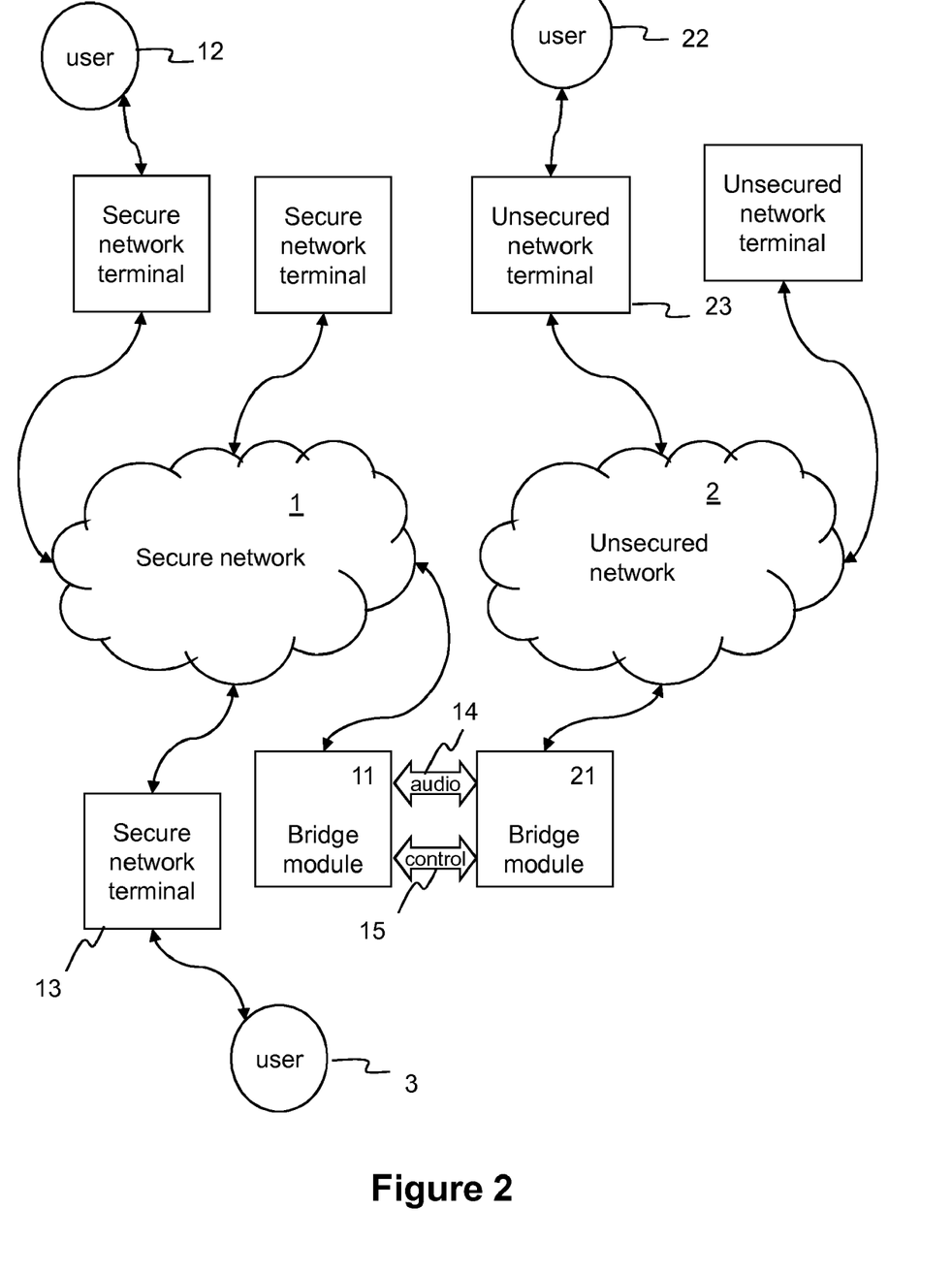
FIG. 2 is a schematic diagram of users having access to two networks linked by a bridge according to the invention.

Referring to FIG. 2, a bridge according to the invention, comprising a first bridge element or module 11 and a second bridge element or module 21, is provided between a first network 1, which may be a secure network and a second network 2, which may be a less secure, unsecured or public network. The networks may, for example, be networks using Internet Protocol and supporting Voice over Internet Protocol (VoIP) or Radio over Internet Protocol (RoIP). By RoIP will be understood a system for radio communication over an IP network, rather than any implied set of protocols such as SIP or H.323 used for VoIP. Thus a user 3 having a first terminal 13 connected to the first network 1 not only has access to another user 12 on the first network 1, and vice versa, but potentially also has access via the bridge 11, 21 to a user 22 on the second network 2, and vice versa. Although the first and second bridge modules are illustrated as separate units, it will be understood that they could physically be combined in a single cabinet, although functionally separate.

Figure 3:
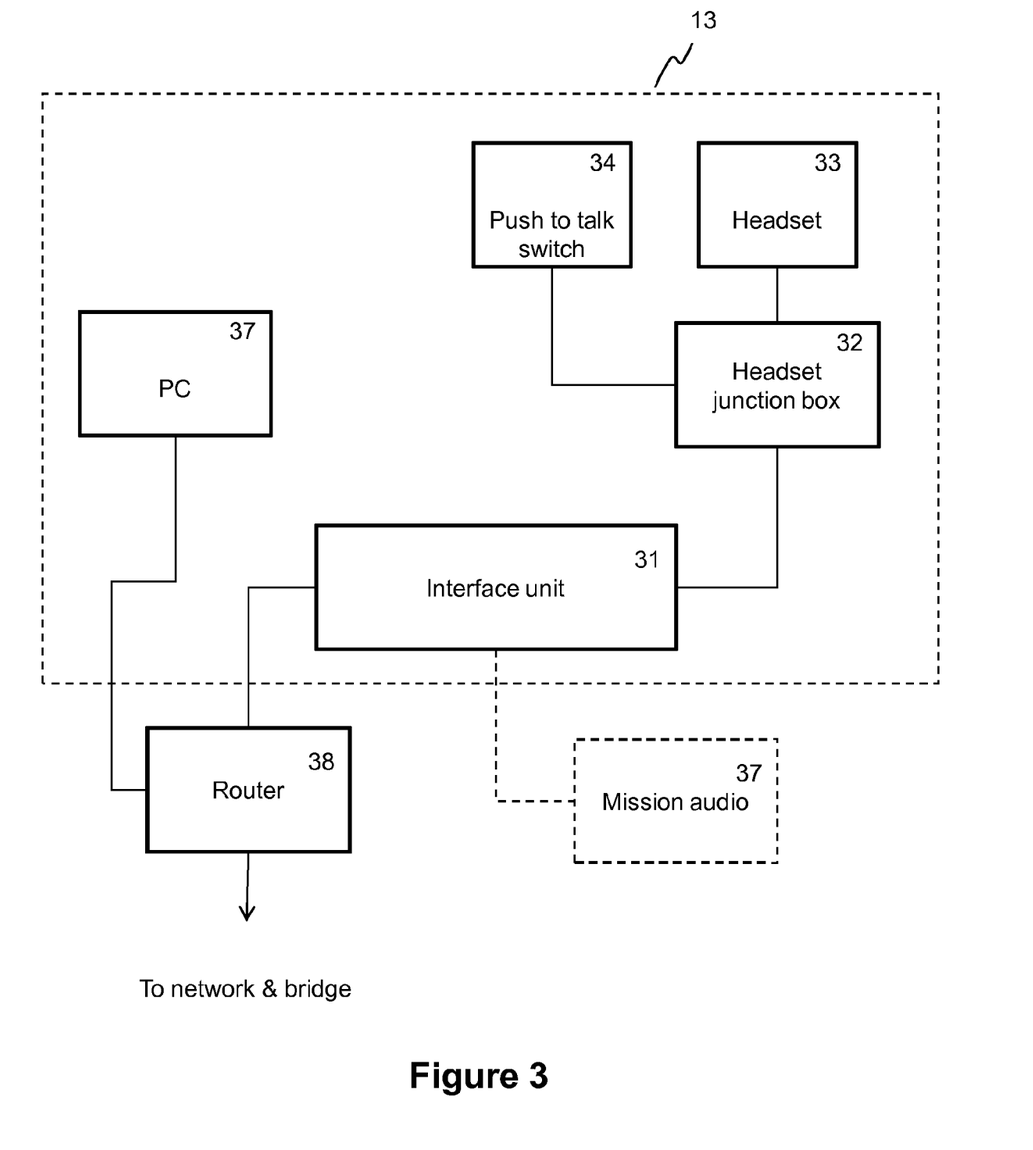
FIG. 3 is a schematic diagram of an operator workstation for use with the invention.
Figure 4:
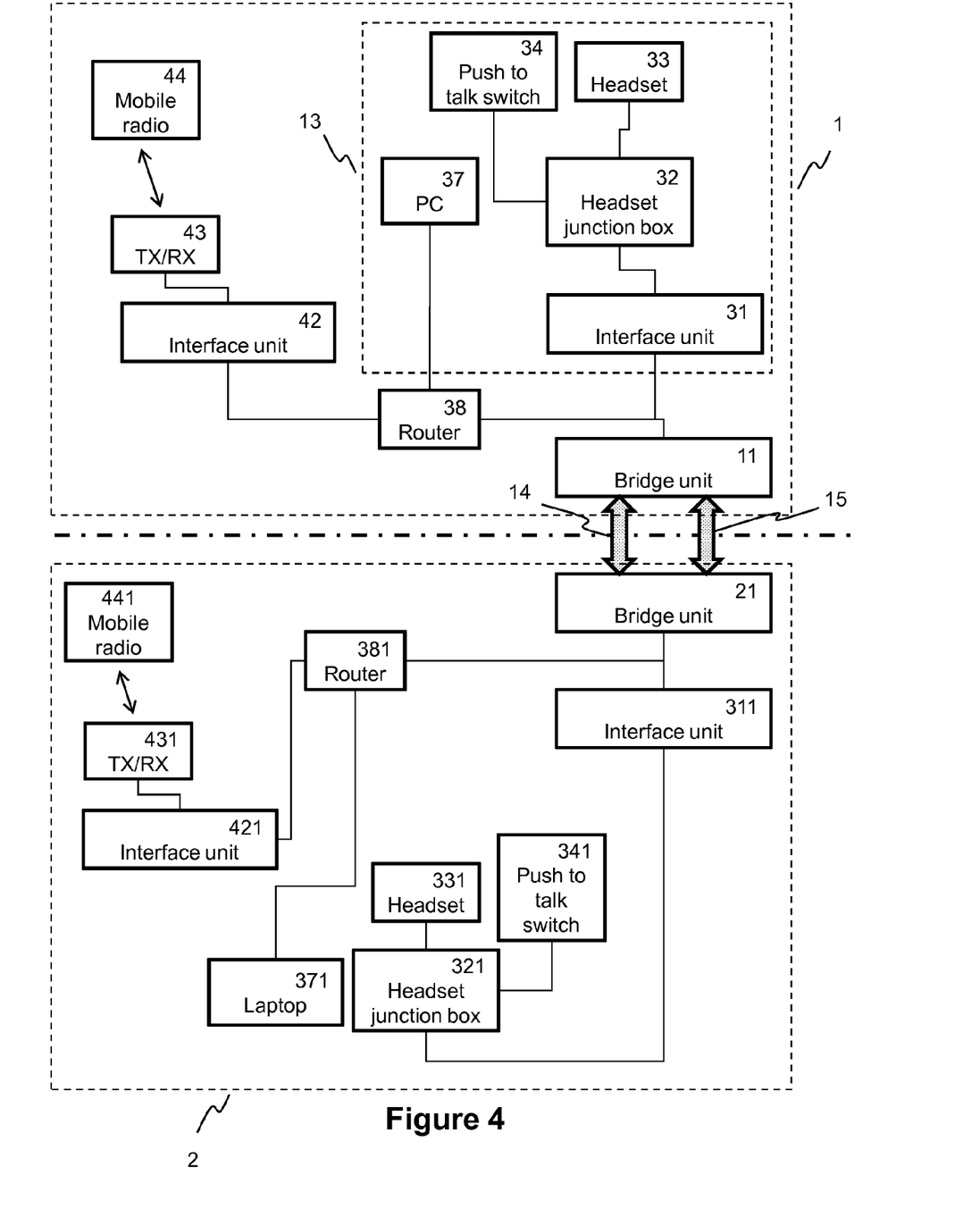
FIG. 4 is a schematic diagram of two networks including a bridge according to the invention.

Referring to FIG. 3, the first terminal 13 connected to the first network 1 may include a first interface unit 31 to which is connected at a first port a headset junction box 32 to which are connected a headset 33 and a push-to-talk switch 34. Connected to a second port of the first interface unit 31 is a router 38 to which is also connected a personal computer 37 for browser-based call management. As best seen in FIG. 4, the router 38 provides access to the first network 1 and via the first network to the first bridge element 11. As shown in FIG. 3, there may also optionally be provided an outlet to a mission audio monitor 37 for monitoring communications to and from first terminal 13.

Referring to FIG. 4, there is shown schematically elements of the first network 1 linked to elements of the second network 2 by the bridge 11, 21. In addition to the elements of the first network 1 shown in FIG. 3, the first network 1 comprises a second interface unit 42 connected to the router 38. A transmitter/receiver 43 is connected to a port of the second interface unit 42 for communications with a mobile radio unit 44. It will be understood that the mobile radio is a dumb device and does not itself include browser software for call management. It will also be understood that where the first network 1 is a secure network, communications between the transmitter/receiver 43 and the mobile radio unit 44 is secure. The router is also shown schematically linked to a port of the first element 11 of the bridge 11, 21.

Elements of the second network 2 substantially mirror elements of the first network 1. Thus connected to the second element 21 of the bridge 11, 21 is a third interface unit 311. Connected to the third interface unit 311 is a second headset junction box 321 to which are connected a second head set 331 and a second push to talk switch 341. A laptop computer 371, for use in association with the second headset 331, is connected via a second router 381 via the second network 2 to the second bridge element 21. Also connected to the second router is a fourth interface unit 421 to which is connected a second transmitter/receiver unit 431 for communication with a second mobile wireless unit 441.

It will be understood that only exemplary components or elements of the first and second networks are illustrated and typically both networks will comprise many more terminals than those illustrated of the same or different types.

The first bridge element 11 is connected to the second bridge element only by an analog audio link 14 and a General Purpose Input Output control link 15 which effectively cannot pass digital data between the networks but merely call negotiating signals between the bridge elements.

In an embodiment of the invention, three forms of security are provided to prevent unauthorised communication, especially of digital data, across the bridge.

User Security

A first level of security is provided by browser-based call management. The browser-based call management provides call negotiation dialogues and labelling of source and destination of each connection to an associated network terminal. In an embodiment of the invention, 12 different security levels are supported. A browser window will typically have a plurality of call buttons to support a variety of call types, including direct calls, which are point-to-point calls in which full-duplex communication between parties can be established and dynamic calls which allow a user to type in a called number or select a number from a directory list to initiate a call. In an embodiment each call button may be programmed for manual or auto-answer. Manual answer provides call recipients an ability to accept or reject incoming calls. A dialog box may identify a calling party and provide security-related information and may also provide an ability to direct an incoming call to the user's right or left ear or both ears. Automatic answering allows calls to be accepted automatically if no security dialogue is required. A call blocking list may be included in a user profile containing any number to be excluded from a user's selection list. Managed conference calls allow conference initiators to accept or reject requests from other users to join a multicast conference. A pop-up menu may be available to indicate real-time status of conference call members. Participants can elect either merely to listen or also to speak. Unmanaged conference calls enable multicast audio to be routed to an unlimited number of available destinations, so that many users may participate in conferences while using system resources efficiently. There may also be an option to monitor calls to allow a user to listen to an audio source. An ability for the monitoring user to speak can be selected when desired but the monitoring user can revert to listening only without a call being re-negotiated.

Administrative Security

In an embodiment of the invention a second form of security is provided by configuration control which determines between which terminals communications are authorised. Since a central database may not always be available for configuration management, a configuration management database can be used at different sites by different administrators and subsets of data exported between sites. Overall enterprise administrators may define system architecture and global parameters whereas hieratically subordinate local administrators define user profiles and other settings. Thus the database is designed to allow local sites to import enterprise data while preserving their local data. To maintain integrity of the configuration management process, a checksum such as an MD5 checksum may be created and saved when data is exported and the checksum verified at load, save and import operations.

Physical Security

Referring especially to FIG. 4, physical security is provided by the bridge 11, 21 in which the first bridge element or module 11 in the first network 1 is connected to the second bridge element or module 21 in the second network 2 only by an analog audio link 14 and a General Purpose Input Output (GPIO) control link 15 which effectively cannot pass digital data between the networks but merely GPIO call negotiation signals between the bridge elements.

A General Purpose Input Output (GPIO) interface provides a flexible method of interfacing a wide range of peripheral devices. A configurable data sense port can operate as a general purpose input/output in which each pin can be configured as either an input or output, for example using a GPIO direction register. Typically 32 lines are used for data input and output and three lines for handshaking.

It will be understood that theoretically, GPIO can pass digital data but that there is a very low risk of digital data being passed compared to, for example, a network connection because:

Each GPI has a "latency" of 250 ms, i.e. a time taken to assert GPI, read it on the other side, and acknowledge it, so a data rate is only 4 bits/s per IO line, i.e. 16 bit/s for a set of four channels. This is too slow to be of any practical concern of a possibility of effective data transmission across the bridge between a first and second network.

There is a tightly controlled state machine with only a few predetermined available states for the GPIO, so it is almost impossible to use GPIO for generic data transfer.

Figure 5:
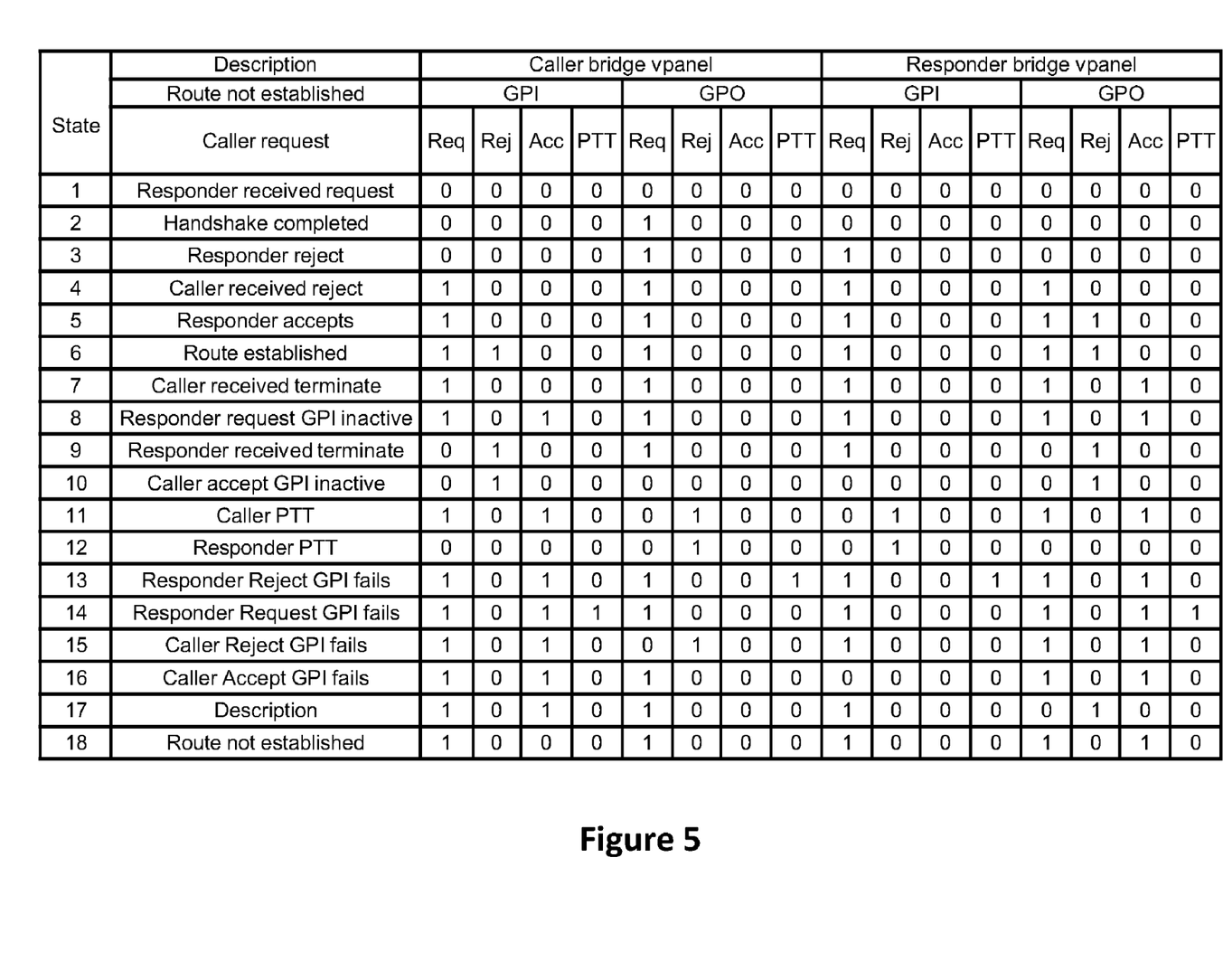
FIG. 5 is a state table suitable for use in the invention.

FIG. 5 is a state table of the bridge elements 11, 21 for a caller, for example, in the first network 1 and a responder in the second network 2 and a corresponding look-up table for each state for a caller bridge element and a responder bridge element. The instantiation provides six independent bridge channels. Each channel uses 4 GPI inputs and 4 GPI outputs, and each channel has its own independent state machine. The state machine design used for each channel is, however, the same.

Figure 7:
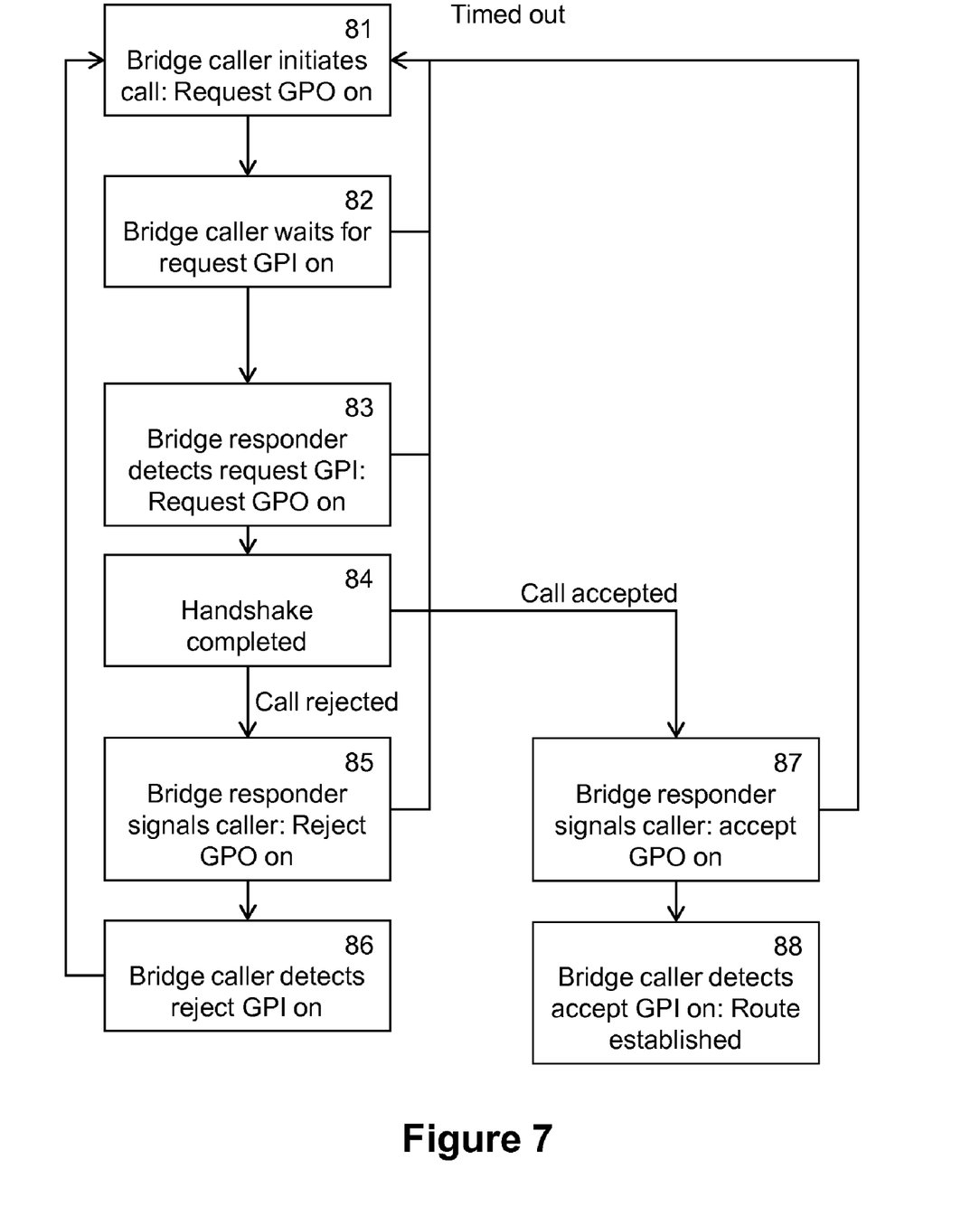
FIG. 7 is a flowchart of a method of initiating a call corresponding to the state change diagram of FIG. 6.

Referring to FIG. 7, to initiate 81 a call the caller activates a request GPO. The corresponding bridge element then waits 82 for its bridge counterpart, the responder, to detect 83 the caller's request GPO as a GPI and as a result activates 83 its request GPI. The responder request GPO is seen by the caller as a GPI and hence, the handshake is complete 84. Following completion 84 of the handshake procedure, the responder waits to see if the call is accepted, rejected or timed out. On acceptance, the responder activates 87 its accept GPO which is seen as an accept GPI by the caller and hence, the route is established 88. On rejection or timeout the responder activates 85 its reject GPO which is seen as an reject GPI 86 by the caller and hence, the route is not established.

Figure 6:
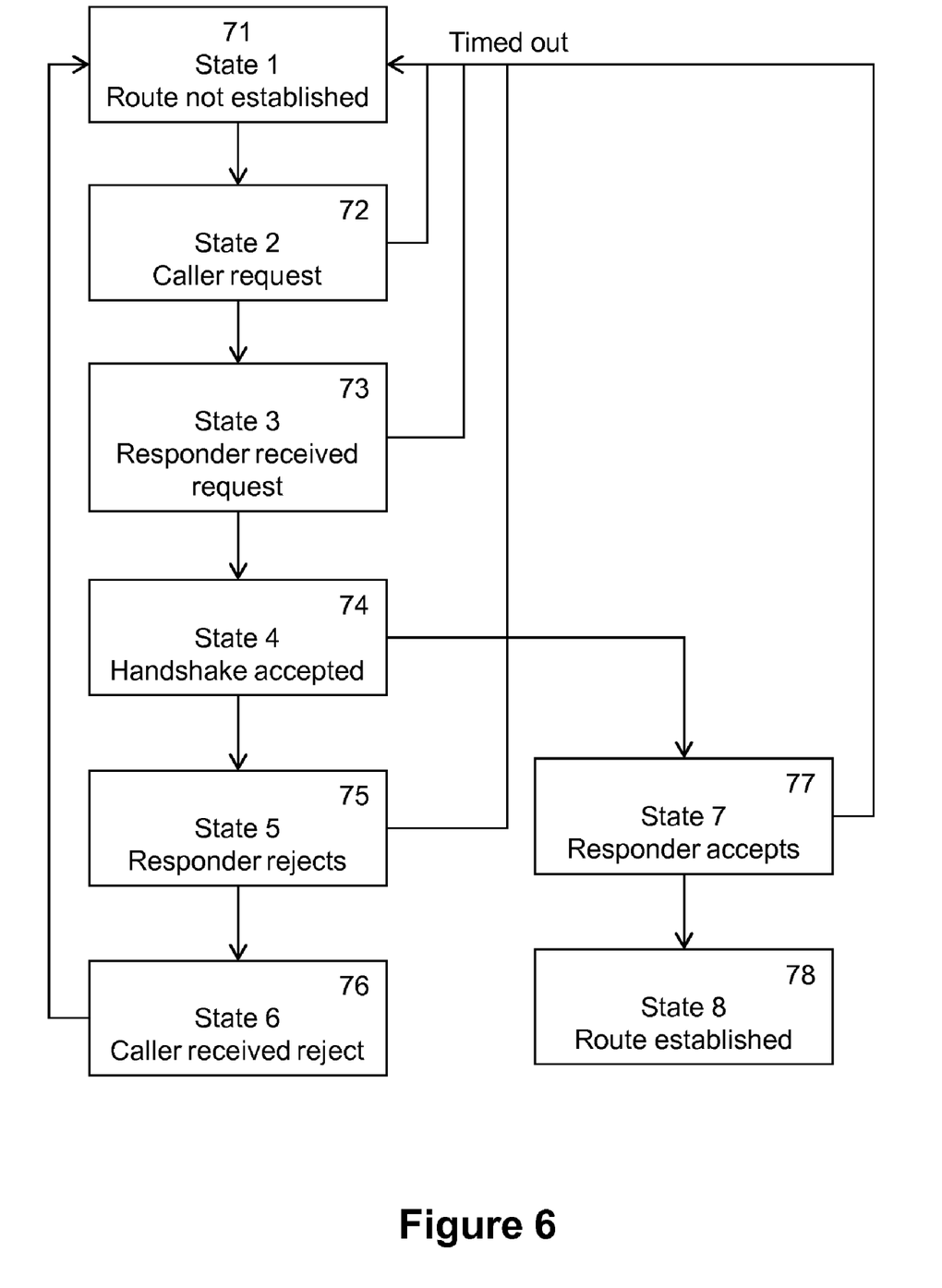
FIG. 6 is a state change diagram of call initiation using the state table of FIG. 5.

The corresponding changes of state of the first and second bridge elements are illustrated in FIG. 6, referring also to FIGS. 2 and 5. For the purposes of illustration, the second bridge element 21 in a less secure network 2 is regarded as the caller bridge and the first bridge element 11 in a more secure network 1 is regarded as the responder bridge and an unsecured network terminal 23 in the less secure network seeks to establish a route to a secure network terminal 13 in the more secure network. Thus initially the caller bridge element and the responder bridge element are in State 1 in which a route between the respective terminals is not established 71. On seeking to establish a route from the unsecured network terminal 23 to the secure network terminal 13 across the bridge between the networks, the caller bridge element changes to a state 2 in which the caller bridge element requests the responder bridge element for General Purpose Input 72 and then to state 3 in which the responder bridge element receives the request 73. A handshake procedure then takes place between the bridge elements and on completion a state 4 is entered in which GPI and General Purpose Output (GPO) is requested 74 by both the sender bridge element and the responder bridge element. If the call is rejected, by a configuration management rule or by a user 3 of the responder secure network terminal 13 or by a timeout, i.e. if the user connected to the responder interface unit's browser panel does not respond to the (already handshaken, at the GPIO level) request within a configurable timeout, state 5 is entered in which GPI is rejected 75 by the responder bridge element and then enters a state 6 in which the caller bridge element receives 76 the rejection. If, on the other hand the responder accepts the call, for example because calls from unsecured network terminal 23 are accepted by a configuration rule and the user 3 chooses 77 to receive the call, a state 7 is entered in which GPO is accepted by the responder bridge element. The system then enters 78 a state 8 in which an audio route is established between terminal 23 in the less secure network 2 and terminal 13 in the more secure network 1 in such a manner that digital data effectively cannot pass across the bridge elements between secure network terminal 13 and unsecured network terminal 23 but only analog audio can pass from one network to the other across the bridge elements.

Figure 9:
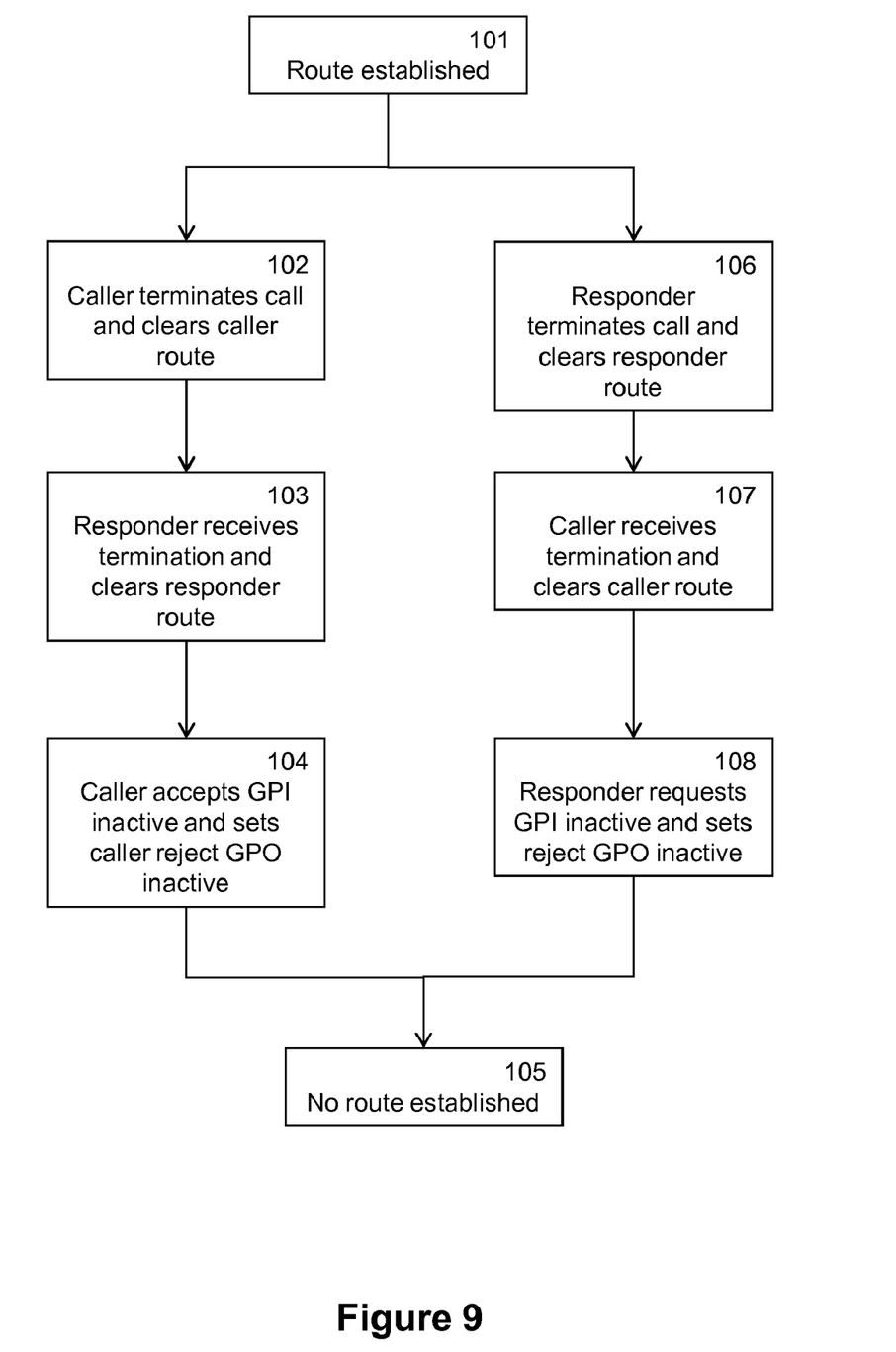
FIG. 9 is a flowchart of a method of call cancellation corresponding to the state change diagram of FIG. 8.

Referring to FIG. 9, a process of cancelling a call between a caller at the unsecured network terminal 23 and a responder at the secure network terminal 13 proceeds in the following steps. Starting from a state in which a route has been established 101 between the two terminals, in a first path the caller terminates the call and clears 102 the caller route. The responder receives the termination and clears 103 the responder route. The caller accepts GPI inactive and sets 104 caller reject GPO inactive and the system changes 105 to a state in which no route is established between the terminals.

In a second, alternative, path the responder terminates the call and clears 106 the responder route. The caller receives the termination and clears 107 the caller route. The responder requests GPI inactive and sets 108 reject GPO inactive and the system changes 105 to a state in which no route is established between the terminals.

Figure 8:
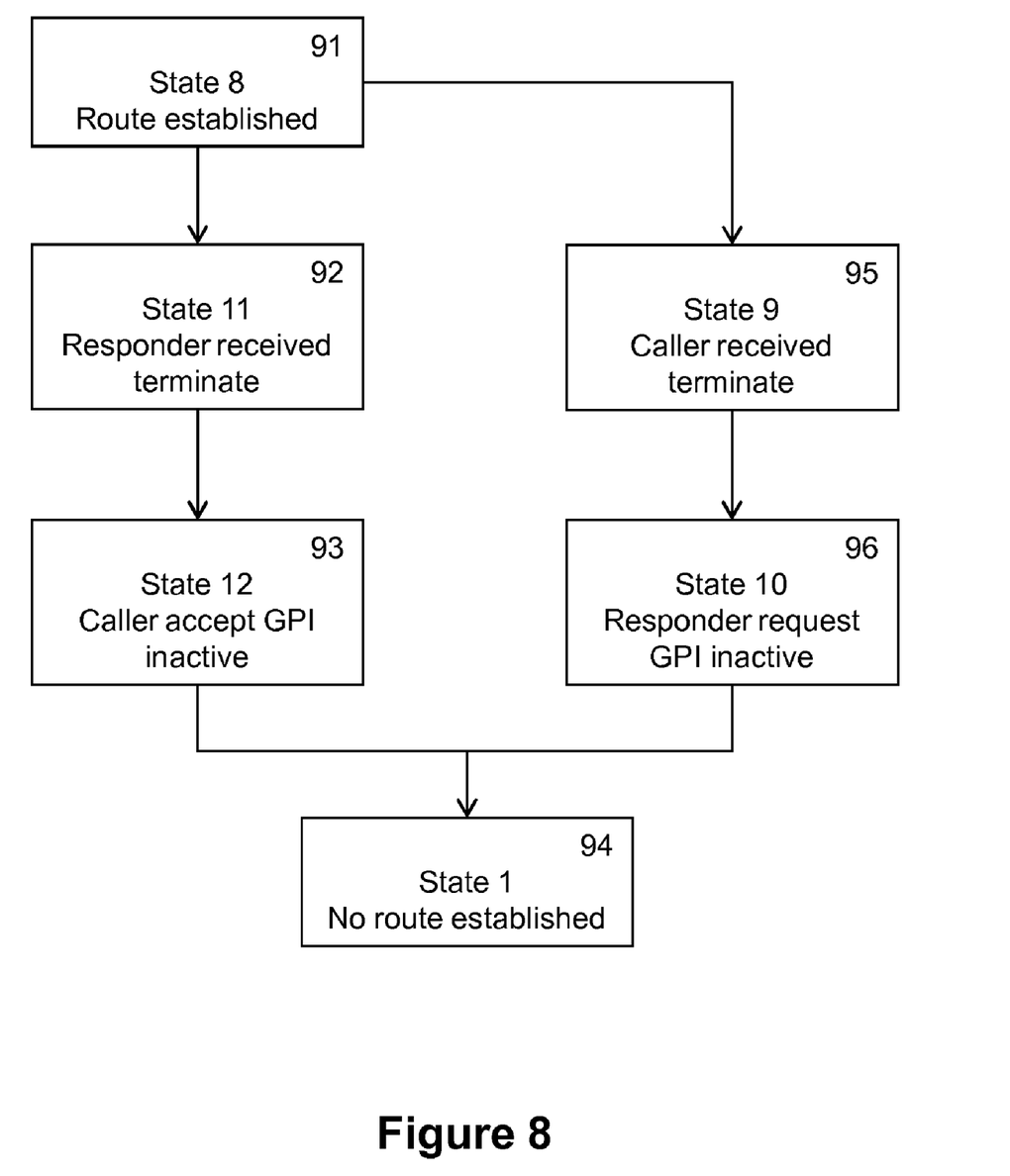
FIG. 8 is a state change diagram of call cancellation using the state table of FIG. 5.

Referring to FIGS. 5 and 8, the system passes through the following corresponding states when a call is cancelled. Initially the system is in state 8 with a route established 91 between the terminals. In the first path described above, the system enters 92 a state 11 on receipt by the responder of a terminate signal from the caller in which GPI is still requested and accepted but GPO is rejected by the caller bridge element and GPI is rejected but GPO is still requested and accepted by the responder bridge element. The system then enters 93 a state 12 in which GPI is no longer requested or accepted by the caller bridge element and GPO is no longer requested or accepted by the responder bridge element. The system then changes 94 state to state 1 in which no route is established and GPI and GPO are not requested or accepted by either caller or responder.

In the second alternative path described above, the system enters 95 a state 9 on receipt by the caller of a terminate signal from the responder in which GPI is rejected but GPO is requested by the caller bridge element and GPI is requested but GPO is rejected by the responder bridge element. The system then enters 96 a state 10 in which GPO is no longer requested by the caller bridge element and GPI is no longer requested by the responder bridge element. The system then changes 94 state to state 1 in which no route is established and GPI and GPO are not requested or accepted by either caller or responder.

Figure 10:
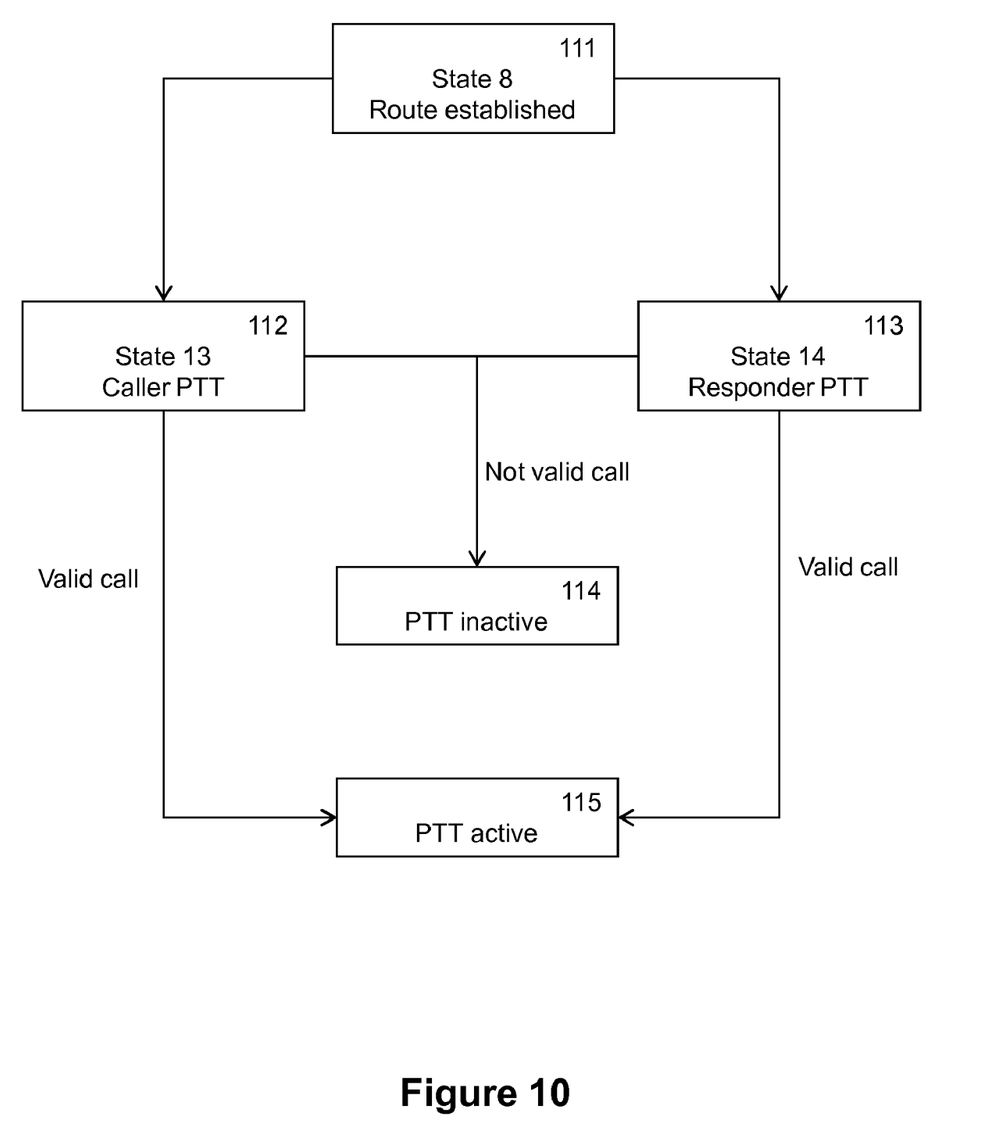
FIG. 10 is a state change diagram of a push to talk fail safe procedure using the state table of FIG. 5.

Referring to FIG. 10, in a push-to-talk fail-safe procedure with the system in 111 a state 8 in which a call is established between first and second terminals in a first network and a second network respectively, on a user on the first terminal selecting to push to talk (PTT), the system enters 112 state 13 in which the caller bridge element PTT GPO is set active and as a result the responder bridge element sees the caller GPO as a PTT GPI and hence, the first terminal user PTT is propagated 115 across the system. On a user on the second terminal selecting to PTT the system enters 113 state 14 in which the responder bridge element PTT GPO is set active and as a result the caller bridge element sees the responder GPO as a PTT GPI and hence, the second terminal user PTT is propagated 115 across the system. The first and second terminal users can activate their PTT at anytime as long as state 8 exists 111. If an established route does not exist then the PTT cannot propagate across for either the first or second terminal users and the PTT GPO is reset to 114 an inactive state. If there was an established route and active PTT GPO then these are reset to 114 an inactive state in the event of deviation from the established route 111 state 8.

Figure 11:
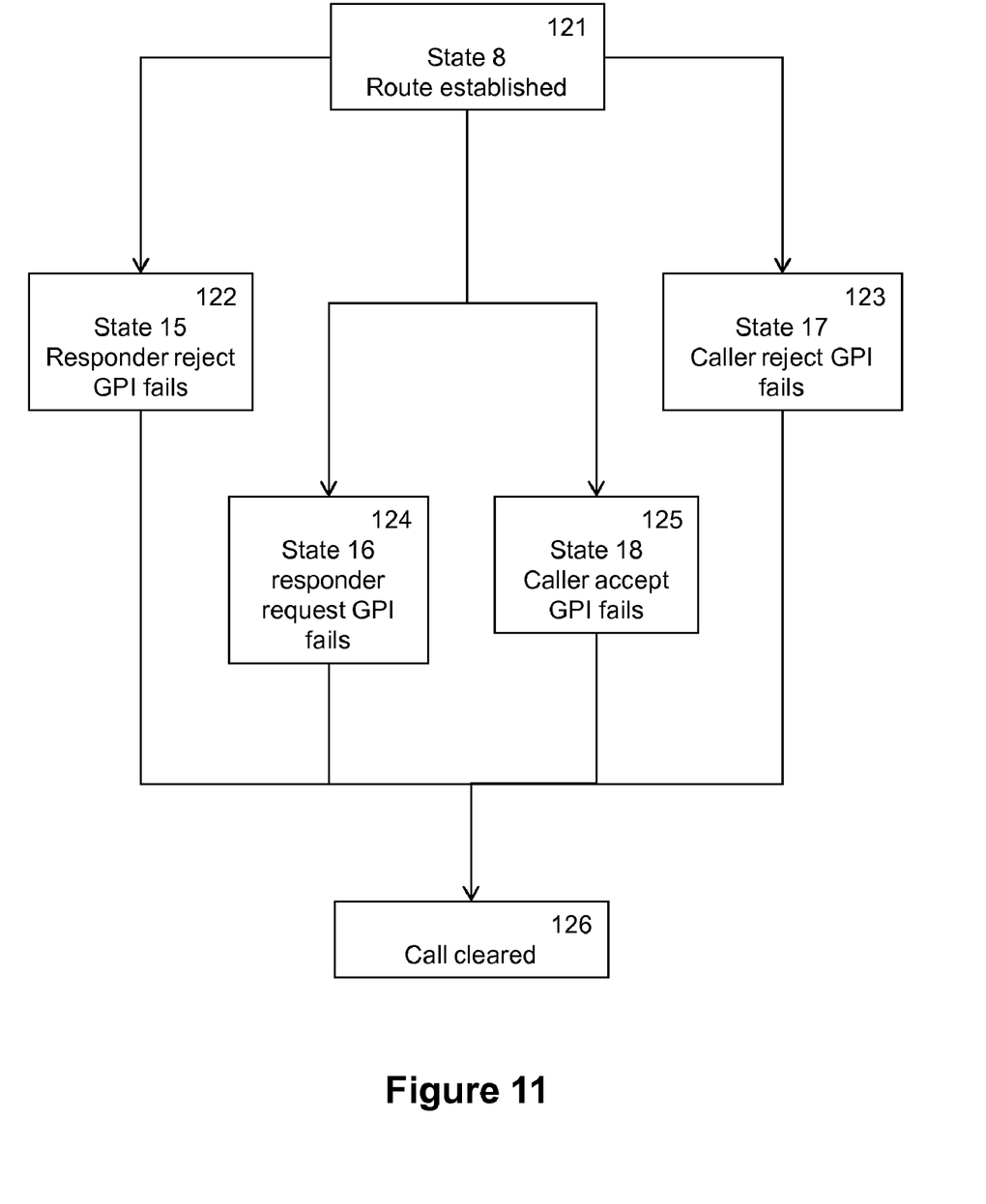
FIG. 11 is a state change diagram of a General Purpose Input Output (GPIO) failure or cable break procedure using the state table of FIG. 5.

Referring to FIG. 11, in a GPIO failure or cable break procedure, the system is in 121 a state 8 in which a call is established between first and second terminals in a first network and a second network respectively. In a first path the system enters 122 state 15 if the responder fails to reject GPI because of, for example, a GPIO failure or cable break, and the call is cleared 126. Similarly, in a second path, the system enters 124 state 16 if the responder fails to request GPI and the call is cleared 126. Similarly, in a third path, the system enters 125 state 18 if the caller fails to accept GPI and the call is cleared 126. Finally, in a fourth path the system enters 123 state 17 if the caller fails to reject GPI and the call is cleared 126.

Thus the invention provides the advantages of a security bridge to allow higher security networks or enclaves to communicate with lower security networks or enclaves. The invention provides physical security by using analog signals to support voice, call signalling and push-to-talk. Signals crossing over a physical security boundary between networks or enclaves are only analog audio for voice and GPIO for call negotiation signalling. However, it will be understood that the bridge of the invention is not limited to linking networks at least one of which is a secure network and can also be used for linking two unsecured networks In addition, browser-based call management, which can be used with known standard web browsers, allows the system to be used with any workstation irrespective of an operating system used. Access to the browser-based call management is through a secure logon procedure. A single browser panel window is used whether communicating within a single enclave or across enclave boundaries. To prevent inadvertent communication between users at different security levels, a call security dialogue is presented to a user to accept or reject a call before the call is connected. Moreover, an administrator can define a plurality of security levels, for example 12 levels, and assign each user to a particular security level. Each call button in the browser panel window may then be colour coded and labelled clearly to indicate a security level of a potential caller. Since a user may be involved in many calls simultaneously a security level summary reminder window may indicate real-time status of the different security levels with which the user is communicating. As an additional precaution, call blocking can be configured to prevent combinations of users from communicating or making IP connections on the network Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

Although the present invention has been described with reference to preferred embodiments, workers skilled in the art will recognize that changes may be made in form and detail without departing from the spirit and scope of the invention.

We claim:

1. A bridge for linking a first communications network to a second communications network arranged to prevent digital data readily passing between the first communications network and the second communications network through the bridge, the bridge comprising a first bridge module linked to the first communications network and a second bridge module linked to the second communications network, wherein the first bridge module is linked to the second bridge module by only an analog audio link and a General Purpose Input Output call negotiation signalling link, which do not support digital data transmission.

2. The bridge as claimed in claim 1, wherein latency in the General Purpose Input Output call negotiation signalling link results in a signalling data rate between the first bridge module and the second bridge module too slow for effective digital data transmission between the first communications network and the second communications network through the bridge.

3. The bridge as claimed in claim 1, wherein the signalling link is controlled by a state machine with limited predetermined available states arranged so that the bridge cannot be used for generic digital data transfer across the bridge.

4. The bridge as claimed in claim 1, arranged to link a first communications network to a second communications network wherein the first communications network has a higher security classification than the second communications network.

5. The bridge as claimed in claim 1, wherein at least one of the first and second communications networks is an Internet Protocol network supporting at least one of Voice over Internet Protocol and Radio over Internet Protocol.

6. A network terminal arranged to communicate with a first communications network linked to a second communication network by the bridge as claimed in claim 1, wherein the network terminal comprises:

an interface unit connectable via a router to the first communications network;

an audio input/output connection for communication with the interface; and a user interface connectable to the first communications network for call management of the network terminal.

7. The network terminal as claimed in claim 6, further comprising a push-to-talk switch.

8. A network terminal as claimed in claim 6, further comprising a radio transmitter/receiver connectable to the interface unit and arranged to communicate wirelessly with a mobile radio.

9. A network terminal as claimed in claim 6, wherein the user interface comprises a browser comprising browser call management for call negotiation.

10. A network terminal as claimed in claim 9, wherein the browser call management comprises call rejection.

11. A communications system comprising the bridge as claimed in claim 1 linking a first communications network and a second communications network.

12. A communications system as claimed in claim 11 comprising configuration control for controlling between which users on the first and second networks communications are authorised.

13. Computer executable software code stored on a non-transitory data recording medium, which, when executed by a computer, causes a bridge to link a first communications network to a second communications network arranged to prevent digital data readily passing between the first communications network and the second communications network through the bridge, the bridge comprising a first bridge module linked to the first communications network and a second bridge module linked to the second communications network, wherein the first bridge module is linked to the second bridge module by only an analog audio link and a General Purpose Input Output call negotiation signaling link, which do not support digital data transmission.

* * * * *